United States Patent
Gruner-Nielsen et al.

(10) Patent No.: US 6,707,976 B1
(45) Date of Patent: Mar. 16, 2004

(54) INVERSE DISPERSION COMPENSATING FIBER

(75) Inventors: Lars Gruner-Nielsen, Bronshoj (DK); Stig Nissen Knudsen, Frederiksberg (DK); Morten Ostergaard Pedersen, Vallensbaek (DK)

(73) Assignee: Fitel USA Corporation, Norcross, GA (US)

( * ) Notice: Subject to any disclaimer, the term of this patent is extended or adjusted under 35 U.S.C. 154(b) by 80 days.

(21) Appl. No.: 10/234,818

(22) Filed: Sep. 4, 2002

(51) Int. Cl.[7] .................................................. G02B 6/02
(52) U.S. Cl. ........................ 385/123; 385/126; 385/127
(58) Field of Search .................................. 385/123, 127, 385/126

(56) References Cited

U.S. PATENT DOCUMENTS

| | | |
|---|---|---|
| 4,261,639 A | 4/1981 | Kogelnik et al. |
| 4,807,950 A | 2/1989 | Glenn et al. |
| 5,191,631 A | 3/1993 | Rosenberg |
| 5,327,515 A | 7/1994 | Anderson et al. |
| 5,327,516 A * | 7/1994 | Chraplyvy et al. ......... 385/123 |
| 5,361,319 A | 11/1994 | Antos et al. |
| 5,367,588 A | 11/1994 | Hill et al. |
| 5,371,597 A | 12/1994 | Favin et al. |
| 5,430,817 A | 7/1995 | Vengsarkar |
| 5,611,016 A | 3/1997 | Fangmann et al. |
| 5,647,039 A | 7/1997 | Judkins et al. |
| 5,740,292 A | 4/1998 | Strasser |
| 5,781,673 A | 7/1998 | Reed et al. |
| 5,878,182 A | 3/1999 | Peckham |
| 5,878,183 A | 3/1999 | Sugiyama et al. |
| 5,887,104 A * | 3/1999 | Sugizaki et al. ............ 385/123 |
| 6,011,886 A | 1/2000 | Abramov et al. |
| 6,055,348 A | 4/2000 | Jin et al. |
| 6,137,924 A | 10/2000 | Strasser et al. |
| 6,148,127 A | 11/2000 | Adams et al. |
| 6,317,549 B1 | 11/2001 | Brown |
| 6,483,975 B1 * | 11/2002 | Hsu et al. .................. 385/123 |
| 2001/0028775 A1 * | 10/2001 | Hasegawa et al. .......... 385/127 |
| 2002/0097971 A1 * | 7/2002 | Mukasa et al. ............. 385/124 |

FOREIGN PATENT DOCUMENTS

| | | |
|---|---|---|
| WO | WO 01/69822 | 9/2001 |

OTHER PUBLICATIONS

Knudsen et al., "New Dispersion–Slope Managed Fiber Pairs for Ultra Long Haul Transmission Systems," National Fiber Optic Engineers Conference, pp. 1599–1607 (2001).*

Knudsen et al.; "New Dispersion–Slope Managed Fiber Pairs for Ultra Long Haul Transmission Systems"; Article; National Fiber Optic Engineers Conference; 2001 Technical Proceedings; 2001; pp. 1599–1607.

* cited by examiner

*Primary Examiner*—Hemang Sanghavi
*Assistant Examiner*—Eric Wong
(74) *Attorney, Agent, or Firm*—Gardner Groff, PC

(57) ABSTRACT

An inverse dispersion fiber is provided that has a relatively low fiber loss, a relatively low fiber splice loss and a relatively large effective mode-field area. The inverse dispersion fiber includes a doped core region with an index of refraction $n_1$, a cladding region with an index of refraction $n_2$, and a trench region, a first barrier region and a second barrier region with indices of refraction $n_3$, $n_4$, and $n_5$, respectively, formed between the doped core region and the cladding region. The various regions of the inverse dispersion fiber are manufactured in such a way that the refractive index value ranges are, for example, approximately $0.709\% < (n_1-n_2)/n_2 < 1.0\%$, approximately $-0.358\% < (n_3-n_2)/n_2 < -0.293\%$, approximately $0.194\% < (n_4-n_2)/n_2 < 0.237\%$, and approximately $-0.045\% < (n_5-n_2)/n_2 < -0.037\%$. The inverse dispersion fiber in accordance with the preferred embodiment has a chromatic dispersion of approximately $-44$ picosecond/(nanometer-kilometer) and a relatively large effective core area, $A_{eff}$, that is, for example, greater than approximately 30.0 $\mu m^2$, both at a wavelength of 1550 nm.

22 Claims, 3 Drawing Sheets

INVERSE DISPERSION COMPENSATING FIBER

BACKGROUND OF THE INVENTION

1. Field of the Invention

The invention relates to an inverse dispersion optical fiber. More particularly, the invention relates to an inverse dispersion optical fiber having reduced optical loss relative to conventional inverse dispersion fiber and that is suitable for compensating dispersion in large effective area positive dispersion fiber.

2. Description of the Related Art

Optical fibers are thin strands of glass or plastic capable of transmitting optical signals, containing relatively large amounts of information, over long distances and with relatively low attenuation. Typically, optical fibers are made by heating and drawing a portion of an optical preform comprising a refractive core region surrounded by a protective cladding region made of glass or other suitable material. Optical fibers drawn from the preform typically are protected further by one or more coatings applied to the cladding region.

Advances in transmission over optical fibers have enabled optical fibers to have enormous bandwidth capabilities. Such bandwidth enables thousands of telephone conversations and hundreds of television channels to be transmitted simultaneously over a hair-thin fiber. Transmission capacity over an optical fiber is increased in wavelength division multiplexing (WDM) systems wherein several channels are multiplexed onto a single fiber, with each channel operating at a different wavelength. However, in WDM systems, nonlinear interactions between channels occurs, such as 4-photon mixing, which severely reduces system capacity. This problem has been largely solved by U.S. Pat. No. 5,327,516 (the '516 patent), which is owned by the assignee of the present application. The '516 patent discloses an optical fiber that reduces these nonlinear interactions by introducing a small amount of chromatic dispersion at the operating wavelengths. As the number of WDM channels to be transmitted over a single fiber increases, the optical power carried by the optical fiber also increases. As the optical power increases, the nonlinear effects caused by interaction between the channels also increases. Accordingly, it is desirable for an optical fiber to provide a small amount of chromatic dispersion to each of the WDM channels in order to reduce the nonlinear interactions between the channels, especially in view of ever-increasing bandwidth demands. However, in order to be able to restore the signal after the transmission link, it is important that the dispersion introduced vary as little as possible amongst the different WDM channels.

Important advances have been made in the quality of the material used in making optical fibers. In 1970, an acceptable loss for glass fiber was in the range of 20 dB/km, whereas today losses are generally about 0.25 dB/km. The theoretical minimum loss for glass fiber is about 0.16 dB/km, and it occurs at a wavelength of about 1550 nanometers (nm). Dispersion in a glass fiber causes pulse spreading for pulses that include a range of wavelengths, due to the fact that the speed of light in a glass fiber is a function of the transmission wavelength of the light. Pulse broadening is a function of the fiber dispersion, the fiber length and the spectral width of the light source. Dispersion for individual fibers is generally illustrated using a graph (not shown) having dispersion on the vertical axis (in units of picoseconds (ps) per nanometer (nm), or ps/nm) or ps/nm-km (kilometer) and wavelength on the horizontal axis. There can be both positive and negative dispersion, so the vertical axis may range from, for example, −250 to +25 ps/nm km. The wavelength on the horizontal axis at which the dispersion equals zero corresponds to the highest bandwidth for the fiber. However, this wavelength typically does not coincide with the wavelength at which the fiber transmits light with minimum attenuation.

For example, typical single mode fibers generally transmit best (i.e., with minimum attenuation) at 1550 nm, whereas dispersion for the same fiber would be approximately zero at 1310 nm. Also, the aforementioned theoretical minimum loss for glass fiber occurs at the transmission wavelength of about 1550 nm. Because minimum attenuation is prioritized over zero dispersion, the wavelength normally used to transmit over such fibers is typically 1550 nm. Also, Erbium-doped amplifiers, which currently are the most commonly used optical amplifiers for amplifying optical signals carried on a fiber, operate in 1530 to 1565 nm range. Because dispersion for such a fiber normally will be closest to zero at a wavelength of 1310 nm rather than at the optimum transmission wavelength of 1550 nm, attempts are constantly being made to improve dispersion compensation over the transmission path in order to provide best overall system performance (i.e., low optical loss and low dispersion).

In order to improve dispersion compensation at the transmission wavelength of 1550 nm, it is known to couple the transmission fiber, which normally is a positive dispersion fiber (PDF), with an inverse dispersion fiber (IDF). The positive dispersion transmission fiber typically comprises a single mode fiber designed to introduce dispersion in order to reduce the nonlinear interactions between channels. The inverse dispersion fiber has a negative dispersion and negative dispersion slope that match the dispersion characteristics of the positive dispersion transmission fiber (but are opposite in sign) in order to compensate dispersion in a broad wavelength range and minimize the residual dispersion (i.e., dispersion on wavelength channels other than the center wavelength channel being compensated).

A transmission PDF is coupled to a length of IDF by splicing. The combination of the PDF and the IDF has both an intrinsic fiber loss and a splicing loss. Of course, overall optical loss for a transmission link should be kept at a minimum. This is especially true over long transmission links because more amplifiers are needed in order to prevent transmission quality degeneration when the transmission link has larger losses. For example, in trans-oceanic communications systems it is advantageous to use a combination of large effective area PDF and an IDF having matching dispersion and dispersion slope characteristics that are of opposite sign to those of the PDF. This combination results in the minimal accumulation of residual dispersion over the transmission wavelength range. Conventional IDF has a median loss of, for example, approximately, 0.246 db/km at 1550 nm. One way to decrease the overall loss of the transmission link would be to utilize an IDF that has a lower fiber loss than the conventional IDF that is currently being used.

Many features of a fiber, such as an IDF, can be ascertained from the refractive index profile of the fiber. The refractive index profile shows how the index of refraction of the fiber varies as a function of distance from its central axis. Parameters used for describing the refractive index profile generally are referenced to the index of refraction of the outermost layer of glass. Idealized models of refractive-index profile typically comprise axially symmetric rings or regions of different refractive index. However, changing the number, size and/or shape of any one of these regions generally impacts more than one characteristic of the fiber (e.g., dispersion slope is reduced, but bending loss is increased or effective area is decreased). Thus, it is a significant design effort to create a refractive index profile that provides most if not all of the desired features for the fiber, and yet still be readily manufacturable.

It would be desirable to have an IDF with a refractive index profile that provides the IDF with a lower fiber loss than the fiber loss of the conventional IDF currently being used and that provides minimal accumulation of residual dispersion over a transmission link comprising a combination of a PDF and an IDF. In addition, the loss when splicing this IDF to a PDF should be kept as low as possible. It would also be desirable to provide such an IDF that is suitable for compensating dispersion of a large effective area PDF, such as a super-large effective area PDF.

SUMMARY OF THE INVENTION

The invention is embodied in an optical communications system including one or more optical transmission devices, one or more optical receiving devices, and at least one optical fiber cable coupled therebetween that includes at least one positive dispersion optical fiber and corresponding inverse dispersion optical fiber. According to embodiments of the invention, the inverse dispersion fiber has negative dispersion and a negative dispersion slope around the wavelength 1550 nm. The inverse dispersion fiber includes a doped core region with an index of refraction $n_1$, a cladding region with an index of refraction $n_2$, and a trench region, a first barrier region and a second barrier region with indices of refraction $n_3$, $n_4$, and $n_5$, respectively, formed between the doped core region and the cladding region.

Inverse dispersion fiber according to embodiments of the present invention preferably has a chromatic dispersion of approximately −44 picosecond/(nanometer-kilometer) and a relatively large effective mode-field area, $A_{eff}$, e.g., greater than approximately 30.0 m², both at a wavelength of 1550 nanometers. The various regions of the inverse dispersion fiber are manufactured in such a way that the refractive index value ranges preferably are, e.g., $0.709\% < (n_1-n_2)/n_2 < 1\%$, $-0.358\% < (n_3-n_2)/n_2 < -0.293\%$, $0.194\% < (n_4-n_2)/n_2 < 0.237\%$, and $-0.045\% < (n_5-n_2)/n_2 < -0.037\%$. In accordance with the preferred embodiment of the present invention, manufacture of the optical fiber includes manufacture of a core region having a diameter of approximately 4.83 µm, a trench region having a diameter of approximately 11.01 µm, a first barrier region having a diameter of approximately −18.44 µm, and a second barrier region having a diameter of approximately 21.97 µm.

The refractive index of the core preferably is graded to follow a power law, with an exponent of γ, where 1<γ<7. The core region is doped with, for example, germanium or other suitable material. The trench region, the first barrier region, the second barrier and the cladding region are doped with, for example, germanium and/or fluorine, and/or other suitable material(s). Inverse dispersion optical fiber according to embodiments of the invention provides improved compensation of positive dispersion optical fibers, including existing positive dispersion optical fibers.

DETAILED DESCRIPTION OF THE PREFERRED EMBODIMENT

The IDF described herein will be described as having particular properties and a particular refractive index profile. However, it should be noted that the IDF described herein is an example of the IDF of the present invention. Those skilled in the art will understand, in view of the discussion provided herein, that the IDF of the present invention is not limited to any particular IDF. IDFs having properties and refractive index profiles different from those of the IDF described herein are also within the scope of the present invention.

The IDF of the present invention is suitable for compensating dispersion in many types of optical fibers such as, for example, positive dispersion, pure silica core fiber from Sumitomo Electric Industries, Ltd., as described in "Ultra Low Nonlinearity Low Loss Pure Silica Core Fiber," Electronics Letters Online No: 19991094, Aug. 3, 1999, Vascade 100 fiber from Corning, large effective area fiber from Fujitsu and UltraWave® SLA fiber from Fitel USA Corporation.

Figure 1A:
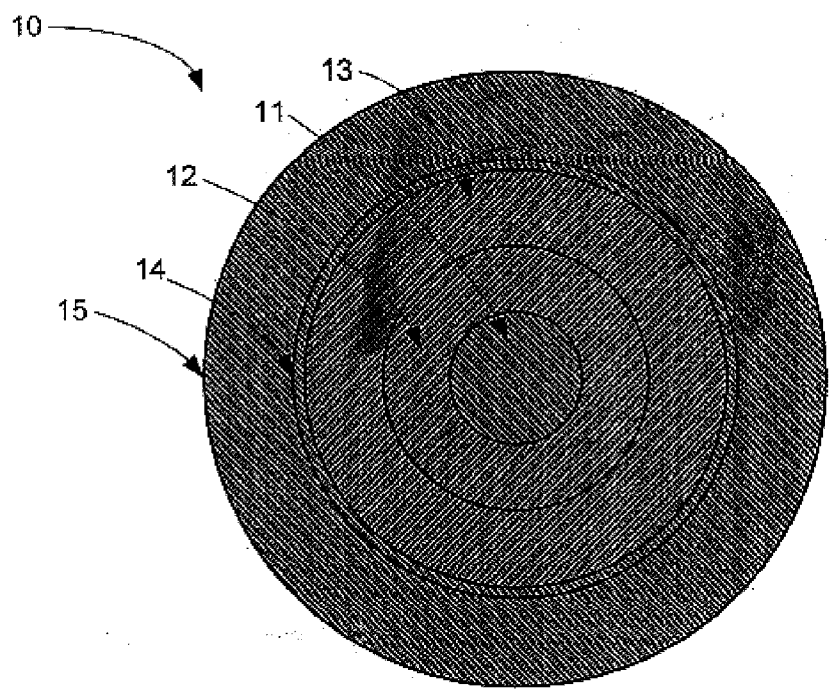
FIG. 1A is a cross-sectional end view of an inverse dispersion optical fiber in accordance with an embodiment of the present invention.
Figure 1B:
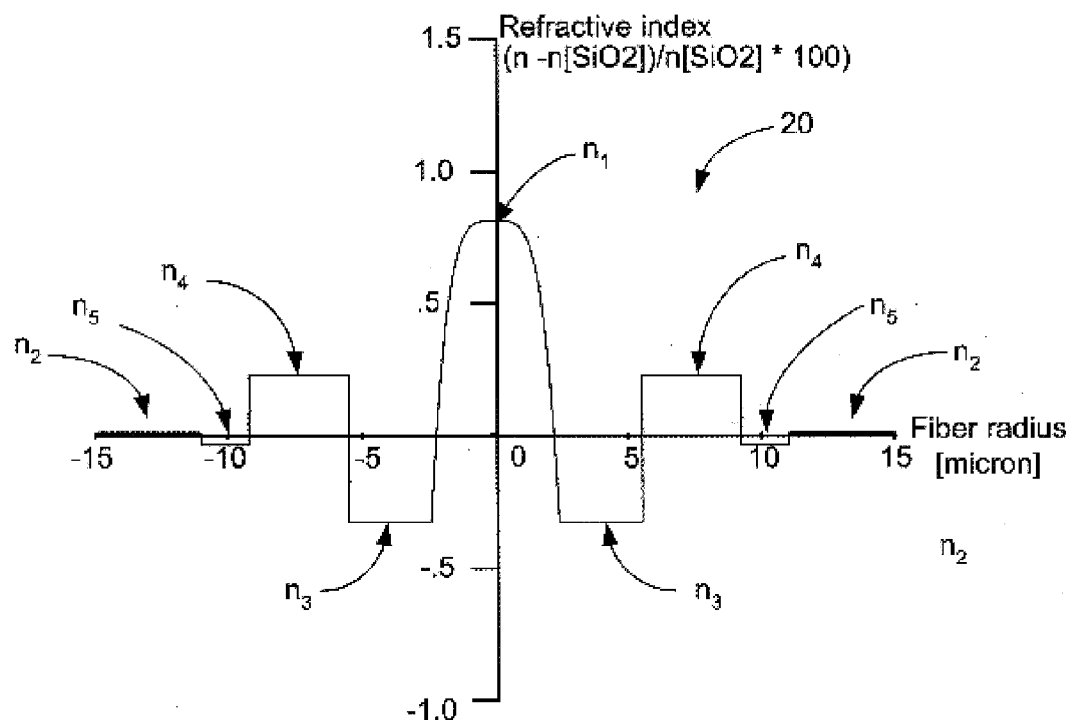
FIG. 1B is a graphical diagram of a refractive index graded-core profile of the inverse dispersion optical fiber shown in FIG. 1.

As discussed above, the overall dispersion of an optical fiber generally results from the combination of material dispersion, which depends on the actual material(s) used in making the optical fiber, and waveguide dispersion, which is a function of the refractive-index profile of the fiber. FIG. 1A shows a cross-sectional view of an IDF 10 and FIG. 1B shows its corresponding refractive index profile in accordance with the preferred embodiment of the present invention. The IDF 10 includes a plurality of layers 11, 12, 13, 14 and 15, each of which has a different index of refraction. The region 11 corresponds to the central core of the optical fiber 10 and has a nominal index of refraction $n_1$. The central core region 11 is surrounded by a first annular ring or region 12 (trench region) that has a nominal refractive index $n_3$. The trench region 12 is surrounded by a second annular region 13 (first barrier region), which has a nominal refractive index $n_4$. The second region 13 is surrounded by a third annular region 14 (second barrier region) that has a nominal refractive index $n_5$. An outer cladding 15 of nominal refractive index $n_2$ surrounds region 14.

It should be noted that the optical fiber 10 is not drawn to scale (the outer diameter of cladding layer 15 preferably is approximately 125 µm, while the diameter of the core region 11 preferably is less than approximately 6 µm). Also, as discussed in greater detail below, because of the relative refractive index values of the various regions, and due to their functions, the first region 12 will be referred to hereinafter as a trench region, the second region 13 will be referred to hereinafter as a first barrier region, and the third region 14 will be referred to hereinafter as a second barrier region. The region 15 will be referred to hereinafter as the outer cladding.

Although the rings in FIG. 1A suggest that the changes between the refractive indices of the regions 11–15 are abrupt, this is not the case. In accordance with the preferred embodiment of the present invention, the fiber 10 is a graded-index fiber and the refractive index changes between adjacent layers are gradual. However, abrupt changes are shown in FIG. 1A to enable distinctions between the regions to be easily made.

FIG. 1B is a graphical representation of the refractive index profile 20 of the fiber 10 shown in FIG. 1A. The Y-axis corresponds to refractive index x 100 and the X-axis corresponds to positions along a radius from the center of the core 11 of the fiber 10 to the outer edge of the cladding 15 of the fiber 10. The refractive index values shown in FIG. 1B are actually relative refractive index values, i.e., they are relative to the refractive index of the outer cladding 15. Therefore, the index values given in FIG. 1B should be regarded as the difference between the index value for the particular region and that of the outer cladding 15 divided by that of the outer cladding (i.e., $(n_{region}-n_{cladding})/n_{cladding})$). Therefore, when the indices of refraction of the various regions of the fiber 10 are discussed herein, it should be understood that they are actually relative indices of refraction.

The core region 11 has an index of refraction $n_1$. The trench region 12 has an index of refraction $n_3$, which is less than $n_1$. The first barrier region 13 has an index of refraction $n_4$, which is greater than $n_3$. The second barrier region 14 has an index of refraction $n_5$, which is less than $n_4$ (that of the first barrier region) but greater than $n_3$ (that of the trench region). The cladding region 15 has an index of refraction $n_2$, which is greater than $n_3$ (that of the trench region) and $n_5$ (that of the second barrier region), but less than $n_4$ (that of the first barrier region) and $n_1$ (that of the core).

The core region 11 has a radius $b_1$. The trench region 12 has an outer radius $b_2$ and an inner radius is $b_1$. The first barrier region 13 has an outer radius $b_3$ and an inner radius $b_2$. The second barrier region 14 has an outer radius $b_4$ and an inner radius $b_3$. The cladding region 15 has an outer radius $b_5$ and an inner radius $b_4$.

The fiber refractive index profile 20 shown in FIG. 1B represents a fiber in accordance with the preferred embodiment of the present invention, which comprises a germanium-doped silica ($SiO_2$) core 11 (e.g., $SiO_2$ doped with an appropriate amount of $GeO_2$), a fluorine (F) and/or germanium (Ge)-doped trench region 12 surrounding the core region 11 (e.g., $SiO_2$ doped with an appropriate amount of $GeO_2$ and F), a germanium and/or fluorine and/or phosphorous-doped first barrier region 13 surrounding the trench region 12 (e.g., $SiO_2$ doped with an appropriate amount of $GeO_2$, F and P), a germanium and/or fluorine-doped and/or phosphorous-doped second barrier region 14 surrounding the first barrier region 13 (e.g., $SiO_2$ doped with an appropriate amount of $GeO_2$ and F, and P) and a pure silica outer cladding 15 surrounding the second barrier region 14.

In the refractive index profile 20 shown in FIG. 1B, the nominal refractive indices $n_1$, $n_3$, $n_4$ and $n_5$, are all relative to the refractive index $n_2$ of the cladding 15, which corresponds to the X-axis in FIG. 1B. The nominal refractive index $n_1$ of the core region 11 is approximately 0.788%. The nominal refractive index $n_3$ of the trench region 12 is approximately –0.326%. The nominal refractive index $n_4$ of the first barrier region 13 is approximately 0.215%. The nominal refractive index $n_5$ of the second barrier region 14 is approximately –0.041%. According to embodiments of the invention, the refractive index profile provides negative dispersion, inverse dispersion, or dispersion compensating optical fiber with relatively large effective transmission area (i.e., effective mode-field area, $A_{eff}$) and transmission characteristics that provide an improved dispersion and dispersion slope match with super-large effective area (SLA) positive dispersion fibers, such as those discussed previously herein. It should be noted that the fiber of the present invention is not limited to these refractive index values. Those skilled in the art will understand, in view of the discussion provided herein, that these refractive indices correspond to the preferred fiber configuration (and thus correspond to the preferred refractive index values) and that other refractive index values are suitable for providing a fiber that meets the goals of the present invention.

The portion of the profile 20 labeled with the refractive index of $n_1$ corresponds to the core region 11 of the fiber 10. The portion of the profile 20 labeled with the nominal refractive index of $n_3$ corresponds to the trench region 12 of the fiber 10. The portion of the profile 20 labeled with the nominal refractive index of $n_4$ corresponds to the first barrier region 13 of the fiber 10. The portion of the profile 20 labeled with the nominal refractive index of $n_5$ corresponds to the second barrier region 14 of the fiber 10. The portion of the profile 20 labeled with the nominal refractive index of $n_2$ corresponds to the cladding region 15 of the fiber 10. It can be seen from the profile 20 that the core 11 has a nominal index of refraction ($n_1$) that is positive, that the trench region 12 has an index of refraction ($n_3$) that is negative, and that the first barrier region 13 has a nominal index of refraction ($n_4$) that is positive, but less than the refractive index $n_1$ of the core region 11. Therefore, the first barrier region 13 has a nominal index of refraction $n_4$ that is greater than that of the trench region $n_3$. The second barrier region 14 has a nominal index of refraction $n_5$, which is less than $n_4$ (that of the first barrier region) but greater than $n_3$ (that of the trench region). The cladding region 15 has an index of refraction $n_2$, which is greater than $n_3$ (that of the trench region) and $n_5$ (that of the second barrier region), but less than $n_4$ (that of the first barrier region) and $n_1$ (that of the core).

Figures 2A, 2B:
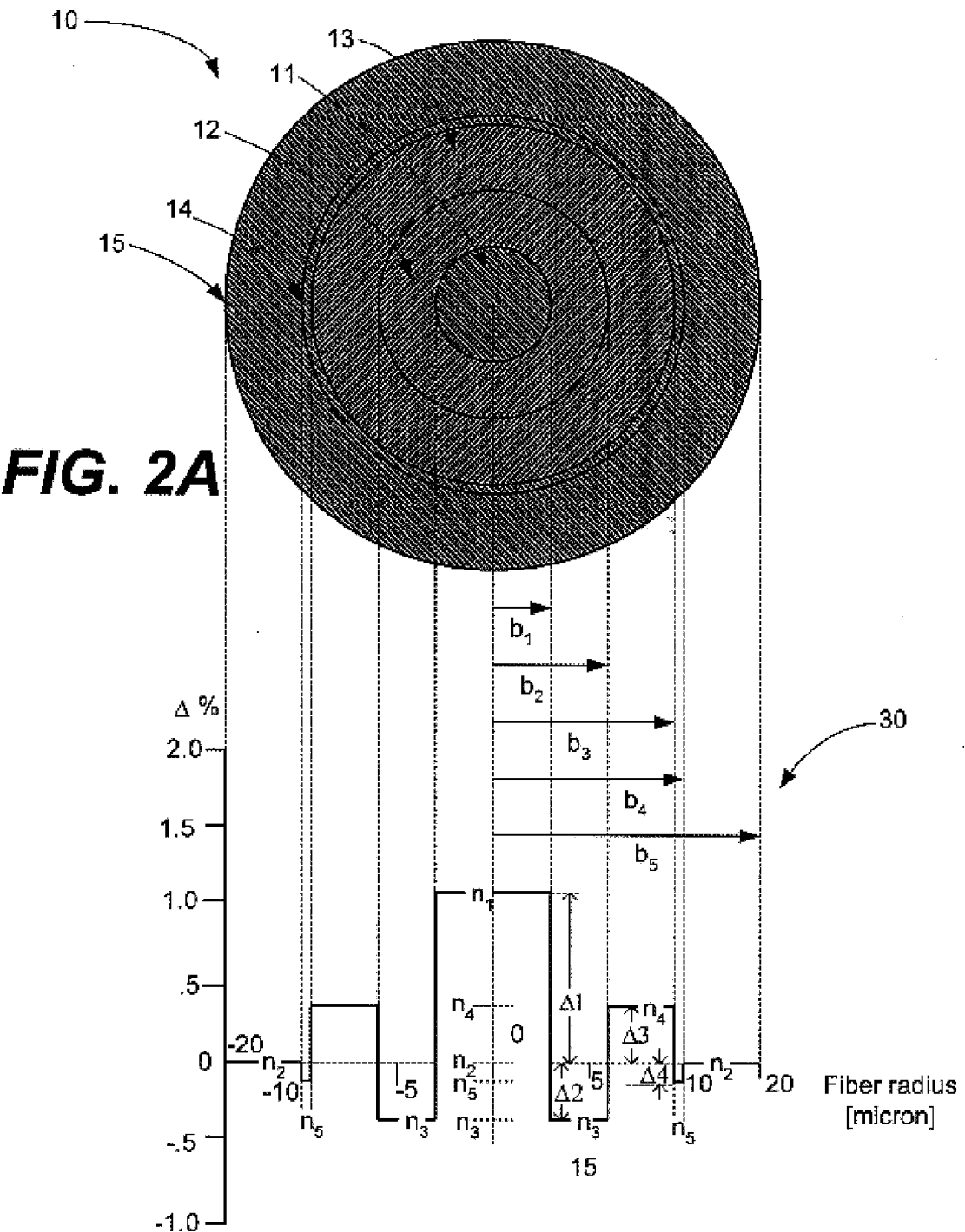
FIG. 2A is the same as FIG. 1A and is repeated to demonstrate the relationship between the refractive indices of the different layers of the fiber as a function of the radius of the various regions.
FIG. 2B is a refractive index difference profile that represents the differences between the refractive indices of the layers of the fiber shown in FIG. 2A as a function of the radius of the various regions.

In addition to graphing the refractive index profile of the optical fiber 10 of the present invention using the actual values of the index of refraction, as shown in FIG. 1B, it is useful to show a refractive index difference profile as a function of normalized refractive index value differences $\Delta_1$, $\Delta_2$, $\Delta_3$ and $\Delta_4$, which are defined as: $\Delta_1=(n_1-n_2)/n_2 \times 100\%$, $\Delta_2=(n_3-n_2)/n_2 \times 100\%$, $\Delta_3=(n_4-n_2)/n_2 \times 100\%$, and $\Delta_4=(n_5-n_2)/n_2 \times 100\%$. This can be seen with reference to FIG. 2A and FIG. 2B. FIG. 2A is identical to FIG. 1A and is repeated to demonstrate how the refractive index differences shown in FIG. 2B correspond to the regions 11–15 of the optical fiber 10 of the present invention shown in FIG. 2A.

FIG. 2B is a refractive index difference profile 30. The dashed lines between FIG. 2A and FIG. 2B show how the refractive index differences $\Delta_1$, $\Delta_2$, $\Delta_3$ and $\Delta_4$ relate to regions 11–15 of the fiber 10. Using the above difference equations with the refractive index values given above, the following delta values are obtained: $\Delta_1 \approx 0.788\%$; $\Delta_2 \approx -0.326\%$; $\Delta_3 \approx 0.215\%$; and $\Delta_4 \approx -0.041\%$. Preferably, the ranges for the delta values are as follows: $0.709\% < \Delta_1 < 1\%$; $-0.358\% < \Delta_2 < -0.293\%$; $0.194\% < \Delta_3 < \% \ 0.237$; and $-0.045\% < \Delta_4 < -0.037\%$. In accordance with the preferred embodiment of the present invention, $b_1$ is approximately 2.41 μm (i.e., the core region diameter is approximately 4.83 μm), $b_2$ is approximately 5.50 μm (i.e., the trench region diameter is approximately 11.01 μm), $b_3$ is approximately 9.22 μm (i.e., the first barrier region diameter is approximately 18.44 μm) and $b_4$ is approximately 10.98 μm (i.e., the second barrier region diameter is approximately 21.97 μm). Thus, the width of the trench region is approximately 3.09 μm (5.50 μm–2.41 μm), the width of the first barrier region is approximately 3.72 μm (9.22 μm–5.50 μm) and the width of the second barrier region is approximately 1.76 μm (10.98 μm–9.22 μm).

The following table shows the refractive indices for each of the regions 11–14 as well as the diameters of each of the regions 11–14 of the optical fiber of the present invention in accordance with the preferred embodiment.

TABLE 1

| Fiber Region | Diameter [micron] | Refractive index (x1000) [absolute index difference compared to $SiO_2$] |
|---|---|---|
| Second Barrier Region | 21.97 | −0.59 |
| First Barrier Region | 18.44 | 3.12 |
| Trench | 11.01 | −4.72 |
| Core | 4.83 | 11.43 |
| Core | | Index profile exponent γ = 4 |

It should be noted that the refractive index values given in Table 1 are the absolute values as opposed to relative values. The fiber refractive index profile 20 of FIG. 1B is a graded index profile and follows an exponent profile given by the following equation:

$$n(r) = n_0 \cdot (1 - (r/r_0)^\gamma) \, r < r_0 \qquad \text{Equation 1}$$

where n(r) is the core refractive index as a function of the fiber radius and γ, the core index profile exponent, (γ=4 in Table 1 for this example) is an exponent that determines the core shape. The term no is the maximum core refractive index and the term ro is the maximum core radius. The effect of making a core according to the refractive index profile defined by Equation 1 is to lower the anomalous fiber loss term, $\alpha_{anamalous}$, which is given by the following equation:

$$\alpha_{anomalous} \propto \frac{\gamma^2}{(\gamma+2)^2} \qquad \text{Equation 2}$$

Using a core exponent γ of 4, as is the case with the preferred embodiment of the present invention, enables the anomalous loss term $\alpha_{anomalous}$ to be lowered by more than a factor of 2 compared to a similar fiber that has a stepped core refractive index profile with a core exponent γ of 30 or more. As stated above, in accordance with the preferred embodiment of the present invention, the range of γ is approximately 1<γ<7.

The following table lists the median values for the optical parameters of the optical fiber of the present invention having the refractive index profile and other characteristics discussed above with reference to FIGS. 1A–2B.

TABLE 2

| Parameter | Unit | Value |
|---|---|---|
| Total fiber length. | [km] | 2300 |
| OTDR attenuation @ 1550 nm. | [dB/km] | 0.234 |
| Attenuation spike | [dB] | 0.02 |

TABLE 2-continued

| Parameter | Unit | Value |
|---|---|---|
| Maximum 1 km. individual section loss @ 1550 nm. | [dB/km] | 0.242 |
| Chromatic dispersion @ 1550 nm. | [ps/nm km] | −44.16 |
| Chromatic dispersion slope @ 1550 nm. | [ps/nm$^2$ km] | −0.133 |
| Relative dispersion slope @ 1550 nm. | [1/nm] | 0.00303 |
| Cable cutoff wavelength | [nm] | 1341 |
| Mode-field diameter @ 1550 nm. | [micron] | 6.4 |
| Spool PMD | [ps/km$^{0.5}$] | 0.044 |
| Attenuation @ 1385 nm. (Water peak) | [dB/km] | 0.437 |
| Avg. splice loss (IDF - SLA) | [dB] | <0.40 |
| Avg. splice loss (IDF - IDF) | [dB] | <0.15 |

The relative dispersion slope (RDS) specified in Table 2 is defined as RDS=(∂D/∂λ)/D, where D is the chromatic dispersion of the fiber and the derivative of D with respect to λ is the chromatic dispersion slope of the fiber.

Figure 3:
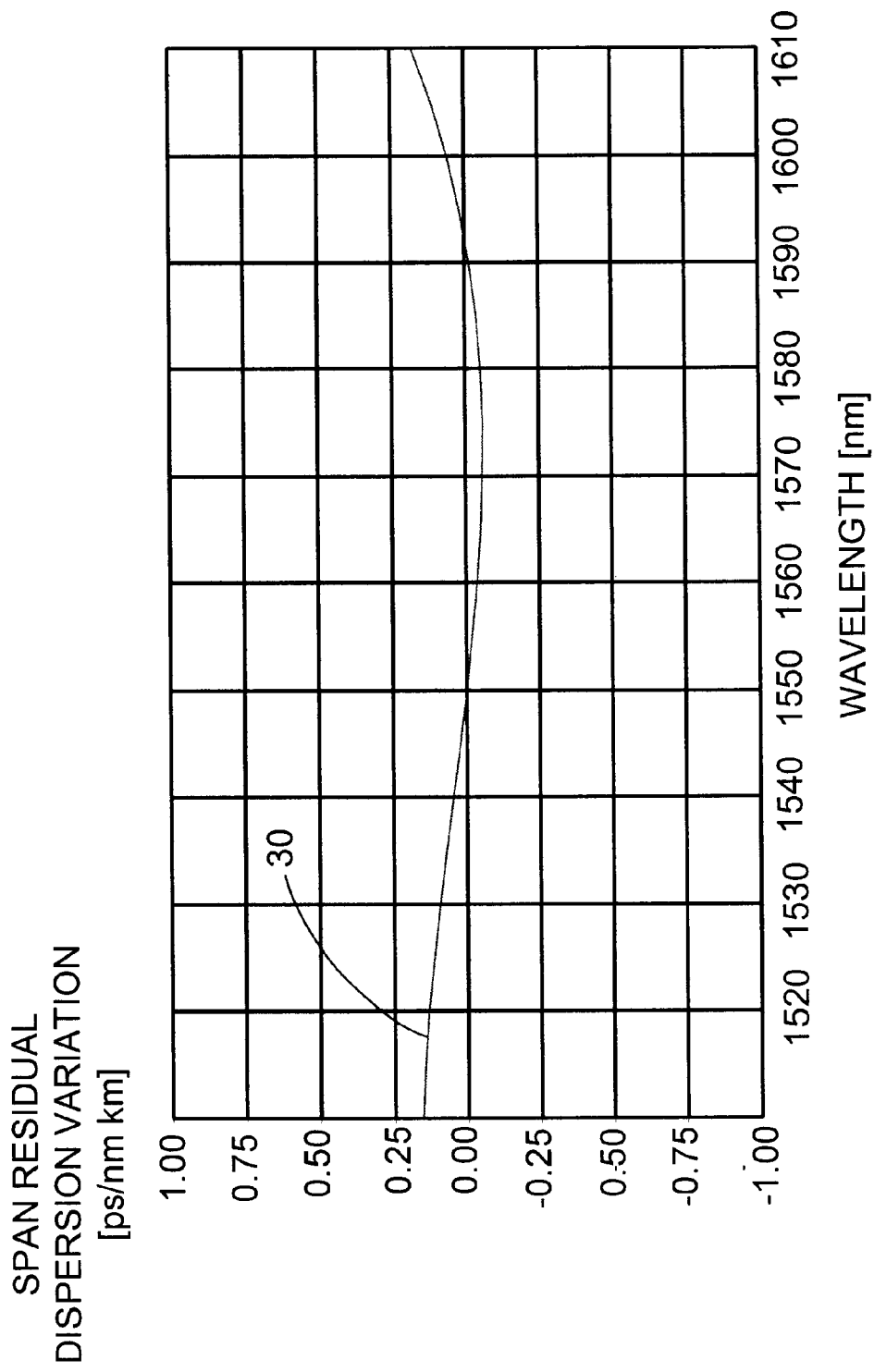
FIG. 3 is a graphical diagram that represents the residual dispersion of a span of an optical fiber link that includes a length of super-large effective area (SLA) fiber and a length of the inverse dispersion optical fiber of the present invention.

FIG. 3 is a graph that illustrates the obtainable residual dispersion as a function of wavelength for a span of an optical fiber link comprising a length of SLA fiber and a length of the IDF fiber of the present invention. It can be seen that the residual dispersion variation can be kept very low in a broad wavelength range around 1550 nm and the curve 30 can be made zero, if desired, at the target transmission wavelength of 1550 nm. The Fiber 10 of the present invention has improved fiber loss characteristics compared to other IDFs, as shown below in Table 3. The fiber 10 of the present invention has a median loss of 0.234 decibels per kilometer (dB/km) at 1550 nm. The "median loss" is the loss value where 50% of the loss measurements fall below the median loss value and 50% of the loss measurements exceed the median value. This is a large improvement over other conventional IDF fibers (not shown) that have been used in the past and that generally have a median loss of at least approximately 0.246 decibels/km (dB/km) at 1550 nm. Table 3 shows the loss for a full 45 km span of combined UltraWave® SLA fiber and a conventional IDF fiber, for a full 45 km span of combined UltraWave® SLA fiber and the IDF fiber of the present invention and for a full 45 km span of combined, conventional non-zero-dispersion submarine fibers, one of which has a large effective area and the other of which has a low dispersion slope. The equivalent effective area is defined as the effective area of a non-zero dispersion shifted fiber with attenuation 0.21 dB/km, which will result in the same non-linear phase shift from self-phase modulation as the transmission span of interest. As a requirement in the calculations, the launched input power is adjusted so as to keep a constant output power.

TABLE 3

| Fiber combination | Equivalent effective area | Loss [dB/km] including splices |
|---|---|---|
| SLA/conventional IDF | 63.9 | 0.233 |
| SLA/IDF in accordance with the preferred embodiment of the invention | 73.3 | 0.218 |
| Conventional NZDF solution | 64 | 0.218 |

It can be seen in Table 3 that the span that utilizes the IDF of the present invention has a larger equivalent effective area and lower loss than with the other spans. It can be seen from Table 2 that the chromatic dispersion of the fiber of the present invention having the index profile of FIG. 1B is −44.16 ps/nm km at 1550 nm, which is greater (numerically)

than that of typical IDFs at 1550 nm. The reduction in loss and increase in absolute dispersion (−44.16) leads to lowered non-linear penalties in the transmission span (the optical fiber link). Therefore, the fiber 10 of the present invention allows an optical fiber link to be made that has very low residual dispersion over the transmission band while, at the same time, providing a large equivalent effective area (and thus low non-linear penalties and low optical loss in the optical fiber link). These improvements, in turn, enable the span length to be increased and the number of amplifiers along the optical fiber link to be decreased, thereby enabling the overall system costs to be reduced.

It will be apparent to those skilled in the art that many changes and substitutions can be made to the embodiments of the optical fibers herein described without departing from the spirit and scope of the invention as defined by the appended claims and their full scope of equivalents. Such changes and substitutions include, but are not limited to, the use of different doping materials to achieve the same general profile shapes, and the use of plastic materials (rather than glass) in making the optical fiber.

What is claimed is:

1. An optical fiber communications system, comprising:
   at least one source of optical energy;
   an optical fiber cable including at least one positive dispersion optical fiber coupled to said at least one source, and at least one inverse dispersion optical fiber coupled to the positive dispersion optical fiber,
   wherein the inverse dispersion optical fiber includes
      a doped core region having an index of refraction $n_1$,
      a cladding region having an index of refraction $n_2$,
      a trench region between the doped core region and the cladding region and adjacent the doped core region, the trench region having an index of refraction $n_3$,
      a first barrier region between the doped core region and the cladding region and adjacent the trench region, the first barrier region having an index of refraction $n_4$, and
      a second barrier region between the doped core region and the cladding region and adjacent the first barrier region, the second barrier region having an index of refraction $n_5$,
      wherein the inverse dispersion optical fiber has a chromatic dispersion between approximately −48 picosecond/(nanometer-kilometer) and −38 picosecond/(nanometer-kilometer) at a wavelength of 1550 nanometer (nm),
      wherein the splice loss between the positive dispersion fiber and said at least one inverse dispersion fiber is less than or equal to 0.40 dB at a wavelength of approximately 1550 nm,
      wherein the optical fiber has a median loss less than or equal to approximately 0.235 decibels (dB) per kilometer (dB/km) at 1550 nm; and
   at least one receiver coupled to the inverse dispersion optical fiber for receiving optical energy from the source.

2. The system as recited in claim 1, wherein the inverse dispersion optical fiber has a relative dispersion slope (RDS) that is approximately 0.0030 $nm^{-1}$ at a wavelength of 1550 nm.

3. The system as recited in claim 1, wherein the doped core region, the cladding region, the trench region, the first barrier region and the second barrier region are configured in such a way that approximately $0.709\% < (n_1-n_2)/n_2 < 1\%$, approximately $-0.358\% < (n_3-n_2)/n_2 < -0.293\%$, approximately $0.194\% < (n_4-n_2)/n_2 < 0.237\%$, and approximately $-0.045\% < (n_5-n_2)/n_2 < -0.037\%$, wherein $\Delta_1 = (n_1-n_2)/n_2$, $\Delta_2 = (n_3-n_2)/n_2$, $\Delta_3 = (n_4-n_2)/n_2$ and $\Delta_4 = (n_5-n_2)/n_2$.

4. The system of claim 3, wherein $\Delta_1$ is approximately 0.788%, $\Delta_2$ is approximately −0.326%, $\Delta_3$ is approximately 0.215%, and $\Delta_4$ is approximately −0.041%.

5. The system as recited in claim 1, wherein the inverse dispersion optical fiber has an effective mode-field area, $A_{eff}$, of at least approximately 30 micrometers squared ($\mu m^2$) at a wavelength of 1550 nm.

6. The system as recited in claim 1, wherein the optical fiber cable further comprises a plurality of inverse dispersion fibers spliced together, wherein the splice loss between spliced inverse dispersion fibers is less than or equal to 0.15 dB at a wavelength of approximately 1550 nm.

7. The system as recited in claim 1, wherein the inverse dispersion optical fiber has a mode-field diameter (MFD) of approximately 6.4 $\mu m$ at a wavelength of 1550 nm.

8. The system as recited in claim 1, wherein the inverse dispersion optical fiber has a chromatic dispersion slope of approximately −0.133 ps $nm^{-2}$ $km^{-1}$ at a wavelength of 1550 nm.

9. The system as recited in claim 1, wherein the radius of the doped core region is approximately 2.415 $\mu m$, the width of the trench region is approximately 3.090 $\mu m$, the width of the first barrier region is approximately 3.715 $\mu m$, and the width of the second barrier region is approximately 1.765 $\mu m$.

10. An inverse dispersion optical fiber, comprising:
    a doped core region having an index of refraction $n_1$;
    a cladding region having an index of refraction $n_2$, wherein approximately $0.709\% < (n_1-n_2)/n_2 < 1\%$, and wherein $\Delta_1 = (n_1-n_2)/n_2$;
    a trench region between the doped core region and the cladding region and adjacent the doped core region, the trench region having an index of refraction $n_3$, wherein approximately $-0.358\% < (n_3-n_2)/n_2 < -0.293\%$, and wherein $\Delta_2 = (n_3-n_2)/n_2$;
    a first barrier region between the doped core region and the cladding region and adjacent the trench region, the first barrier region having an index of refraction $n_4$, wherein approximately $0.194\% < (n_4-n_2)/n_2 < 0.237\%$, and wherein $\Delta_3 = (n_4-n_2)/n_2$; and
    a second barrier region between the doped core region and the cladding region and adjacent the first barrier region, the second barrier region having an index of refraction $n_5$, wherein approximately $-0.045\% < (n_5-n_2)/n_2 < -0.037\%$, and wherein $\Delta_4 = (n_5-n_2)/n_2$.

11. The inverse dispersion optical fiber of claim 10, wherein $\Delta_1$ is approximately 0.788%, $\Delta_2$ is approximately −0.326%, $\Delta_3$ is approximately 0.215%, and $\Delta_4$ is approximately −0.041%.

12. The inverse dispersion optical fiber of claim 10, wherein the optical fiber has a median loss that is less than or equal to approximately 0.235 decibels per kilometer (dB/km) at a wavelength of 1550 nm.

13. The inverse dispersion optical fiber of claim 10, wherein the optical fiber has a relative dispersion slope (RDS) that is approximately 0.0030 per nanometer ($nm^{-1}$) at a wavelength of 1550 nm.

14. The inverse dispersion optical fiber of claim 10, wherein the optical fiber has an effective mode-field area, $A_{eff}$, of at least approximately 30 micrometers$^2$ ($\mu m^2$) at a wavelength of 1550 nm.

15. The inverse dispersion optical fiber of claim 10, wherein the inverse dispersion optical fiber has a mode-field diameter (MFD) of approximately 6.4 $\mu m$ at a wavelength of 1550 nm.

16. The inverse dispersion optical fiber of claim 10, wherein the optical fiber has a chromatic dispersion slope of approximately −0.133 ps nm$^{-2}$ km$^{-1}$ at at a wavelength of 1550 nm.

17. The inverse dispersion optical fiber of claim 10, wherein the radius of the doped core region is approximately 2.415 micrometers ($\mu$m), the width of the trench region is approximately 3.090 $\mu$m, the width of the first barrier region is approximately 3.715 $\mu$m, and the width of the second barrier region is approximately 1.765 $\mu$m.

18. The inverse dispersion optical fiber of claim 10, wherein the inverse dispersion optical fiber has a chromatic dispersion between approximately −48 picosecond/(nanometer-kilometer) and approximately −38 picosecond/(nanometer-kilometer) at a wave length of 1550 nanometer (nm).

19. A method for making an optical fiber, comprising the steps of:

forming a doped core region having an index of refraction $n_1$;

forming a trench region around the doped core region, the trench region having an index of refraction $n_3$;

forming a first barrier region around the trench region, the first barrier having an index of refraction $n_4$;

forming a second barrier region around the first barrier region, the second barrier region having an index of refraction $n_5$; and forming a cladding region around the second barrier region, the cladding region having an index of refraction $n_2$, wherein the doped core region, the cladding region, the trench region, the first barrier region and the second barrier region are configured in such a way that approximately 0.709%<$(n_1-n_2)/n_2$<1%, approximately −0.358%<$(n_3-n_2)/n_2$<−0.293%, approximately 0.194%<$(n_4-n_2)/n_2$<0.237%, and approximately −0.045%<$(n_5-n_2)/n_2$<−0.037%, wherein $\Delta_1=(n_1-n_2)/n_2$, $\Delta_2=(n_3-n_2)/n_2$, $\Delta_4=(n_5-n_2)/n_2$.

20. The method of claim 19, wherein $\Delta_1$ is approximately 0.788%, $\Delta_2$ is approximately −0.326%, $\Delta_3$ is approximately 0.215%, and $\Delta_4$ is approximately −0.041%.

21. An optical fiber preform, comprising:

a doped core region having an index of refraction $n_1$;

a cladding region having an index of refraction $n_2$;

a trench region between the doped core region and the cladding region and adjacent the doped core region, the trench region having an index of refraction $n_3$;

a first barrier region between the doped core region and the cladding region and adjacent the trench region, the first barrier region having an index of refraction $n_4$; and a second barrier region between the doped core region and the cladding region and adjacent the first barrier region, the second barrier region having an index of refraction $n_5$, wherein the doped core region, the cladding region, the trench region, the first barrier region and the second barrier region are configured in such a way that approximately 0.709%<$(n_1-n_2)/n_2$<1%, approximately −0.358%<$(n_3-n_2)/n_2$<−0.293%, approximately 0.194%<$(n_4-n_2)/n_2$<0.237%, and approximately −0.045%<$(n_5-n_2)/n_2$<−0.037%, wherein $\Delta_1=(n_1-n_2)/n_2$, $\Delta_2=(n_3-n_2)/n_2$, $\Delta_3=(n_4-n_2)/n_2$ and $\Delta_4=(n_5-n_2)/n_2$.

22. The optical fiber preform of claim 21, wherein $\Delta_1$ is approximately 0.788%, $\Delta_2$ is approximately −0.326%, $\Delta_3$ is approximately 0.215%, and $\Delta_4$ is approximately −0.041%.

* * * * *